(12) United States Patent
Hoydis et al.

(10) Patent No.: US 11,211,956 B2
(45) Date of Patent: Dec. 28, 2021

(54) TRANSMITTER AND RECEIVER

(71) Applicant: Nokia Solutions and Networks Oy, Espoo (FI)

(72) Inventors: Jakob Hoydis, Paris (FR); Maximilian Arnold, Grab (DE); Marc Gauger, Stuttgart (DE); Stephan Ten Brink, Stuttgart (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/961,103

(22) PCT Filed: Feb. 14, 2018

(86) PCT No.: PCT/FI2018/050102
§ 371 (c)(1),
(2) Date: Jul. 9, 2020

(87) PCT Pub. No.: WO2019/158800
PCT Pub. Date: Aug. 22, 2019

(65) Prior Publication Data
US 2021/0067181 A1    Mar. 4, 2021

(51) Int. Cl.
*H04B 1/04* (2006.01)
*H04B 1/40* (2015.01)
*H04B 1/16* (2006.01)

(52) U.S. Cl.
CPC ............. *H04B 1/04* (2013.01); *H04B 1/16* (2013.01); *H04B 1/40* (2013.01)

(58) Field of Classification Search
CPC ............... H04B 1/04; H04B 1/16; H04B 1/40
(Continued)

(56) References Cited

U.S. PATENT DOCUMENTS 6,151,354 A    11/2000  Abbey
8,385,305 B1 *  2/2013  Negus .................. H04J 1/00
                                                    370/338
(Continued)

FOREIGN PATENT DOCUMENTS

CN    102347779 A    2/2012
CN    105794309 A    7/2016
(Continued)

OTHER PUBLICATIONS

"Uplink Achievable Rate for Massive MIMO Systems with Low-Resolution ADC", IEEE Communications Letters, vol. 19, No. 12, Dec. 2015, pp. 2186-2189.
(Continued)

*Primary Examiner* — Lee Nguyen
(74) *Attorney, Agent, or Firm* — Squire Patton Boggs (US) LLP (57) ABSTRACT

A receiver, a system and a method is described comprising: receiving radio frequency signals at a plurality of receiver modules, wherein each receiver module comprises a plurality of channels, each channel comprising a receiver antenna and a mixer for converting an output of the respective antenna to an analog intermediate frequency signal having a frequency; for each of the plurality of receiver modules, combining the analog intermediate frequency signals of the respective channels into a receiver module analog intermediate frequency signal; and combining the receiver module analog intermediate frequency signals for each of the plurality of receiver modules into a composite output signal, wherein the frequency of the intermediate frequency signal of each channel of each receiver module is different. A similar transmitter, method and transmission system is also described.

15 Claims, 7 Drawing Sheets

(58) Field of Classification Search
USPC .......................................... 455/103, 132, 137
See application file for complete search history.

(56) References Cited

U.S. PATENT DOCUMENTS

| | | | |
|---|---|---|---|
| 2004/0116078 A1* | 6/2004 | Rooyen | H04L 25/03331 |
| | | | 455/101 |
| 2016/0294591 A1 | 10/2016 | Kurchuk et al. | |
| 2017/0111676 A1 | 4/2017 | Ling | |
| 2017/0149465 A1 | 5/2017 | Kurchuk | |
| 2017/0302342 A1 | 10/2017 | Kurchuk | |

FOREIGN PATENT DOCUMENTS

| | | |
|---|---|---|
| CN | 106533518 A | 3/2017 |
| CN | 107425866 A | 12/2017 |
| WO | 2009/021247 A1 | 2/2009 |

OTHER PUBLICATIONS

Zhang et al., "On the Spectral Efficiency of Massive MIMO Systems with Low-Resolution ADCs", IEEE Communications Letters, vol. 20, No. 5, May 2016, pp. 842-845.

Peng et al., "Fronthaul-Constrained Cloud Radio Access Networks: Insights and Challenges", IEEE Wireless Communications, vol. 22, No. 2, Apr. 2015, pp. 152-160.

Liang et al., "Low-Complexity Hybrid Precoding in Massive Multiuser MIMO Systems", IEEE Wireless Communications Letters, vol. 3, No. 6, Dec. 2014, pp. 653-656.

Saavedra, "Microstrip Multiplexer with Compact in-Line Feed Structure", Microwave and Optical Technology Letters, vol. 49, No. 12, Dec. 2007, pp. 3128-3130.

Wilkinson, "An N-Way Hybrid Power Divider", IRE Transactions on Microwave Theory and Techniques, vol. 8, No. 1, Jan. 1960, pp. 116-118.

Kikuchi et al., "Fundamentals of Coherent Optical Fiber Communications", Journal of Lightwave Technology, vol. 34, No. 1, Jan. 1, 2016, pp. 157-179.

Rodriguez et al., "Hybrid Analog-Digital Precoding Revisited Under Realistic RF Modeling", IEEE Wireless Communications Letters, vol. 5, No. 5, Oct. 2016, pp. 528-531.

Wilden et al., "MIRA-CLE, an Experimental MIMO Radar in Ka band", 8th European Conference on Synthetic Aperture Radar, Jun. 7-10, 2010, pp. 382-385.

Tsutsumi et al., "A 15GHz 4-Channel Transmit/Receive RF Core-Chip for High SHF Wide-band Massive MIMO in 5G", IEEE 17th Topical Meeting on Silicon Monolithic Integrated Circuits in RF Systems (SiRF), 2017, pp. 115-117.

Ali et al., "Design of Compact Millimeter Wave Massive MIMO Dual-Band (28/38 GHz) Antenna Array for Future 5G Communication Systems", 17th International Symposium on Antenna Technology and Applied Electromagnetics (ANTEM), Jul. 10-13, 2016, 2 pages.

International Search Report and Written Opinion received for corresponding Patent Cooperation Treaty Application No. PCT/FI2018/050102, dated Aug. 16, 2018, 11 pages.

Communication pursuant to Article 94(3) EPC dated Jun. 15, 2021 corresponding to European Patent Application No. 18707745.8.

First Office Action dated Oct. 9, 2021 corresponding to Chinese Patent Application No. 201880089268.3, with English summary thereof.

* cited by examiner

TRANSMITTER AND RECEIVER

RELATED APPLICATION

This application claims priority to PCT Application No. PCT/FI2018/050102, filed on Feb. 14, 2018, which is incorporated herein by reference in its entirety.

FIELD

The present specification relates to multiple antenna transmitters and receivers, for example multiple-input multiple-output (MIMO) transmitters and receivers.

BACKGROUND

Multiple antenna systems are known for enabling wireless communications having multiple signal paths, typically increasing both data throughput and reliability.

Large antenna arrays (such as so-called "Massive MIMO" systems) may incorporate hundreds or even thousands of antennas in a transmission system. Massive MIMO is an enabling technology for the IEEE $5^{th}$ generation (5G) wireless systems.

Many multiple antenna array systems, such as massive MIMO, typically require a dedicated radio frequency (RF) chain for each antenna. Thus, if M antennas are provided, then M instances of many hardware parts (e.g. analog-to-digital converters (ADCs), digital-to-analog converters (DACs), filters, power amplifiers etc.) are required. Moreover, the ADCs/DACs for different antennas may need to be synchronised or calibrated. This renders scaling for such multiple antenna systems costly, energy consuming and complex.

SUMMARY

In a first aspect, this specification describes a receiver comprising: a plurality of receiver modules, wherein each receiver module comprises a plurality of channels, each channel comprising a receiver antenna and a mixer for converting an output of the respective antenna to an analog intermediate frequency signal having a frequency; a plurality of multiplexer modules, each multiplexer module associated with one of the plurality of receiver modules, wherein each multiplexer module is configured to combine the analog intermediate frequency signals of the respective channels into a receiver module analog intermediate frequency signal; and a power combiner module having a plurality of inputs and an output, the power combiner module configured to receive the receiver module analog intermediate frequency signals from each of the plurality of multiplexer modules and to combine said receiver module intermediate frequency signals to generate a composite output signal at the output of the power combiner module, wherein the power combiner is a passive device, wherein: the frequency of the intermediate frequency signal of each channel of each receiver module is different.

A frequency range of the frequencies of the analog intermediate frequency signals of the channels may divided into a plurality of sub-bands, wherein, for each receiver module, the frequency of each channel is within a different sub-band. Further, each sub-band may include an analog intermediate frequency signal from each of the plurality of receiver modules.

The power combiner module may comprise a plurality of power combiner modules.

The or each power combiner module may be a Wilkinson combiner.

An analog-to-digital converter may be provided for converting the composite output signal into a digital signal. Alternatively, or in addition, an optical modulator may be provided for converting the composite output signal into an optical output signal.

In a second aspect, this specification describes a transmitter comprising: a plurality of transmitter modules, wherein each transmitter module comprises a plurality of channels, each channel comprising a transmit antenna and an upconverter for converting an analog intermediate frequency signal having a frequency into an output for the respective antenna; a plurality of demultiplexer modules, each demultiplexer module associated with one of the plurality of transmitter modules, wherein each demultiplexer module is configured to split an analog transmit module intermediate frequency signal into the analog intermediate frequency signals of the respective channel; and a power splitter module (such as a Wilkinson splitter) having an input configured to receive a composite input signal and a plurality of outputs configured to provide the transmit module intermediate frequency signals for each of the plurality of demultiplexers, wherein the power splitter module is a passive device, wherein: the frequency of the intermediate frequency signal of each channel of each transmitter module is different. A digital-to-analog converter may be provided for converting a digital signal into the composite input signal.

In a third aspect, this specification describes a method comprising: receiving radio frequency signals at a plurality of receiver modules, wherein each receiver module comprises a plurality of channels, each channel comprising a receiver antenna and a mixer for converting an output of the respective antenna to an analog intermediate frequency signal having a frequency; for each of the plurality of receiver modules, combining the analog intermediate frequency signals of the respective channels into a receiver module analog intermediate frequency signal; and combining the receiver module analog intermediate frequency signals for each of the plurality of receiver modules into a composite output signal, wherein the frequency of the intermediate frequency signal of each channel of each receiver module is different.

A frequency range of the frequencies of the analog intermediate frequency signals of the channels may be divided into a plurality of sub-bands, wherein, for each receiver module, the frequency of each channel is within a different sub-band. Further, each sub-band may include an analog intermediate frequency signal from each of the plurality of receiver modules.

The method may comprise converting the composite output signal into a digital signal.

The method may further comprise converting the composite output signal into an optical output signal.

Each channel may be an independent channel, able to receive a different information stream.

In a fourth aspect, this specification describes a method comprising: splitting a composite input signal comprising a plurality of combined transmit module intermediate frequency signals into a plurality of transmit module analog intermediate frequency signals, wherein each of the plurality of transmit module analog intermediate frequency signals is for one of a plurality of transmitter modules; dividing each of the plurality of transmit module analog intermediate frequency signals into a plurality of analog intermediate frequency signals for one of the plurality of transmitter modules, wherein each of the transmitter modules has a plurality of channels, each channel for transmitting one of said analog intermediate frequency signals; and for each channel, upconverting the respective analog intermediate frequency signal to a radio frequency signal and transmitting the radio frequency signal using an antenna, wherein the frequency of each analog intermediate frequency signal of each channel of each transmitter module is different. Each channel may be an independent channel, able to transmit a different information stream.

A frequency range of the frequencies of the analog intermediate frequency signals of the channels may be divided into a plurality of sub-bands, wherein, for each transmitter module, the frequency of each channel is within a different sub-band. Each sub-band may include an analog intermediate frequency signal for each of the plurality of transmitter modules.

The method may further comprise converting the composite input signal from a digital signal to an analog signal.

In a fifth aspect, this specification describes an apparatus configured to perform any method as described with reference to the third or fourth aspects.

In a sixth aspect, this specification describes computer-readable instructions which, when executed by computing apparatus, cause the computing apparatus to perform any method as described with reference to the third or fourth aspects.

In a seventh aspect, this specification describes a receiver comprising: means for receiving radio frequency signals at a plurality of receiver modules, wherein each receiver module comprises a plurality of channels, each channel comprising a receiver antenna and a mixer for converting an output of the respective antenna to an analog intermediate frequency signal having a frequency; for each of the plurality of receiver modules, means for combining the analog intermediate frequency signals of the respective channels into a receiver module analog intermediate frequency signal; and means for combining the receiver module analog intermediate frequency signals for each of the plurality of receiver modules into a composite output signal, wherein the frequency of the intermediate frequency signal of each channel of each receiver module is different.

In an eighth aspect, this specification describes a transmitter comprising: means for splitting a composite input signal comprising a plurality of combined transmit module intermediate frequency signals into a plurality of transmit module analog intermediate frequency signals, wherein each of the plurality of transmit module analog intermediate frequency signals is for one of a plurality of transmitter modules; means for dividing each of the plurality of transmit module analog intermediate frequency signals into a plurality of analog intermediate frequency signals for one of the plurality of transmitter modules, wherein each of the transmitter modules has a plurality of channels, each channel for transmitting one of said analog intermediate frequency signals; and for each channel, means for upconverting the respective analog intermediate frequency signal to a radio frequency signal and transmitting the radio frequency signal using an antenna, wherein the frequency of each analog intermediate frequency signal of each channel of each transmitter module is different.

In a ninth aspect, this specification describes an apparatus comprising: at least one processor; and at least one memory including computer program code which, when executed by the at least one processor, causes the apparatus to: receive radio frequency signals at a plurality of receiver modules, wherein each receiver module comprises a plurality of channels, each channel comprising a receiver antenna and a mixer for converting an output of the respective antenna to an analog intermediate frequency signal having a frequency; for each of the plurality of receiver modules, combine the analog intermediate frequency signals of the respective channels into a receiver module analog intermediate frequency signal; and combine the receiver module analog intermediate frequency signals for each of the plurality of receiver modules into a composite output signal, wherein the frequency of the intermediate frequency signal of each channel of each receiver module is different.

In a tenth aspect, this specification describes an apparatus comprising: at least one processor; and at least one memory including computer program code which, when executed by the at least one processor, causes the apparatus to: split a composite input signal comprising a plurality of combined transmit module intermediate frequency signals into a plurality of transmit module analog intermediate frequency signals, wherein each of the plurality of transmit module analog intermediate frequency signals is for one of a plurality of transmitter modules; divide each of the plurality of transmit module analog intermediate frequency signals into a plurality of analog intermediate frequency signals for one of the plurality of transmitter modules, wherein each of the transmitter modules has a plurality of channels, each channel for transmitting one of said analog intermediate frequency signals; and for each channel, upconvert the respective analog intermediate frequency signal to a radio frequency signal and transmitting the radio frequency signal using an antenna, wherein the frequency of each analog intermediate frequency signal of each channel of each transmitter module is different.

In an eleventh aspect, this specification describes a computer-readable medium having computer-readable code stored thereon, the computer readable code, when executed by the at least one processor, causes performance of: receiving radio frequency signals at a plurality of receiver modules, wherein each receiver module comprises a plurality of channels, each channel comprising a receiver antenna and a mixer for converting an output of the respective antenna to an analog intermediate frequency signal having a frequency; for each of the plurality of receiver modules, combining the analog intermediate frequency signals of the respective channels into a receiver module analog intermediate frequency signal; and combining the receiver module analog intermediate frequency signals for each of the plurality of receiver modules into a composite output signal, wherein the frequency of the intermediate frequency signal of each channel of each receiver module is different.

In a twelfth aspect, this specification describes a computer-readable medium having computer-readable code stored thereon, the computer readable code, when executed by the at least one processor, causes performance of: splitting a composite input signal comprising a plurality of combined transmit module intermediate frequency signals into a plurality of transmit module analog intermediate frequency signals, wherein each of the plurality of transmit module analog intermediate frequency signals is for one of a plurality of transmitter modules; dividing each of the plurality of transmit module analog intermediate frequency signals into a plurality of analog intermediate frequency signals for one of the plurality of transmitter modules, wherein each of the transmitter modules has a plurality of channels, each channel for transmitting one of said analog intermediate frequency signals; and for each channel, upconverting the respective analog intermediate frequency signal to a radio frequency signal and transmitting the radio frequency signal using an antenna, wherein the frequency of each analog intermediate frequency signal of each channel of each transmitter module is different.

BRIEF DESCRIPTION OF THE DRAWINGS

Example embodiments will now be described, by way of non-limiting examples, with reference to the following schematic drawings, in which.

DETAILED DESCRIPTION

Figure 1:
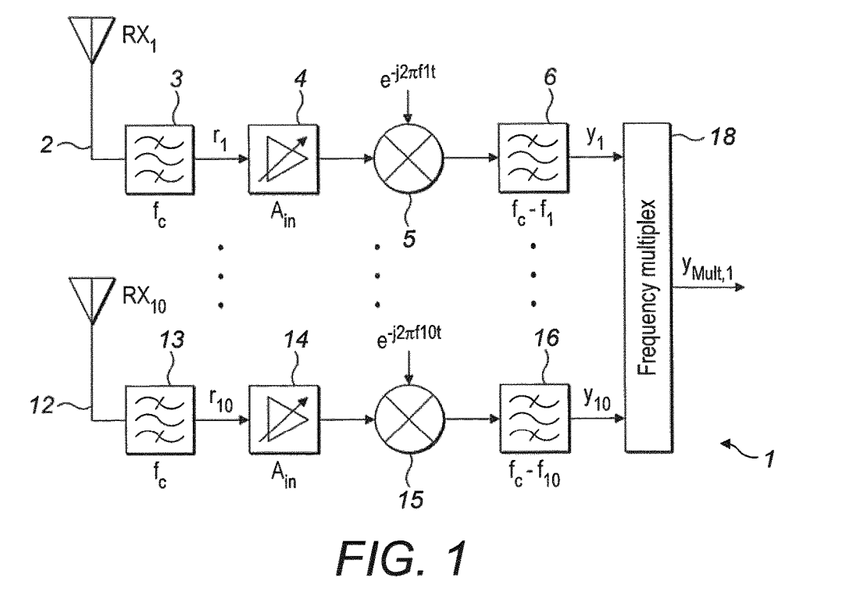
FIG. 1 is a block diagram of a receiver system in accordance with an example embodiment.

FIG. 1 is a block diagram of a receiver system, indicated generally by the reference numeral 1, in accordance with an example embodiment.

The receiver system 1 includes multiple analog radio frequency (RF) channels. The first RF channel comprises a receiver antenna 2, a bandpass filter 3, an amplifier 4, a mixer 5 and a frequency multiplexing filter 6. The receiver antenna 2 receives a radio signal $RX_1$. The radio signal $RX_1$ is filtered and amplified by bandpass filter 3 and amplifier 4 respectively. The mixer 5 and frequency multiplexing filter 6 convert the radio signal $RX_1$ into an intermediate frequency signal $y_1$ having an intermediate frequency $f_c-f_1$ (discussed further below).

The example system 1 includes ten channels receiving first to tenth radio signals $RX_1$ to $RX_{10}$ respectively. The tenth channel is explicitly shown in FIG. 1 and includes a receiver antenna 12, a bandpass filter 13, an amplifier 14, a mixer 15 and a frequency multiplexing filter 16. The tenth channel receives the tenth radio signal $RX_{10}$. The radio signal $RX_{10}$ is filtered and amplified by bandpass filter 13 and amplifier 14 respectively. The mixer 15 and frequency multiplexing filter 16 convert the radio signal $RX_{10}$ into an intermediate frequency signal $y_{10}$ having an intermediate frequency $f_c-f_{10}$ (discussed further below). The second to ninth channels (not shown) each have a similar antenna, bandpass filter, amplifier, mixer and frequency multiplexing filter.

The intermediate frequency signals $y_1$ to $y_{10}$ are provided as inputs to a frequency multiplexer 18. The frequency multiplexer 18 combines, with a low loss, the ten intermediate frequency signals into a single signal $y_{Mult,1}$. Of course, the provision of ten antennas and channels (and therefore ten intermediate frequency signals) is described by way of example only—the system 1 could include any number of antenna and channels.

In one embodiment, the system 1 is provided on a daughterboard with N=10 RF inputs ($RX_1$ to $RX_{10}$). After bandpass filtering, the received signals $r_i$, i=1, 2, . . . , 10, are amplified and mixed onto intermediate frequencies $f_c-f_i$, where $f_c$ is the carrier frequency and $f_i$ is discussed further below.

Figure 2:
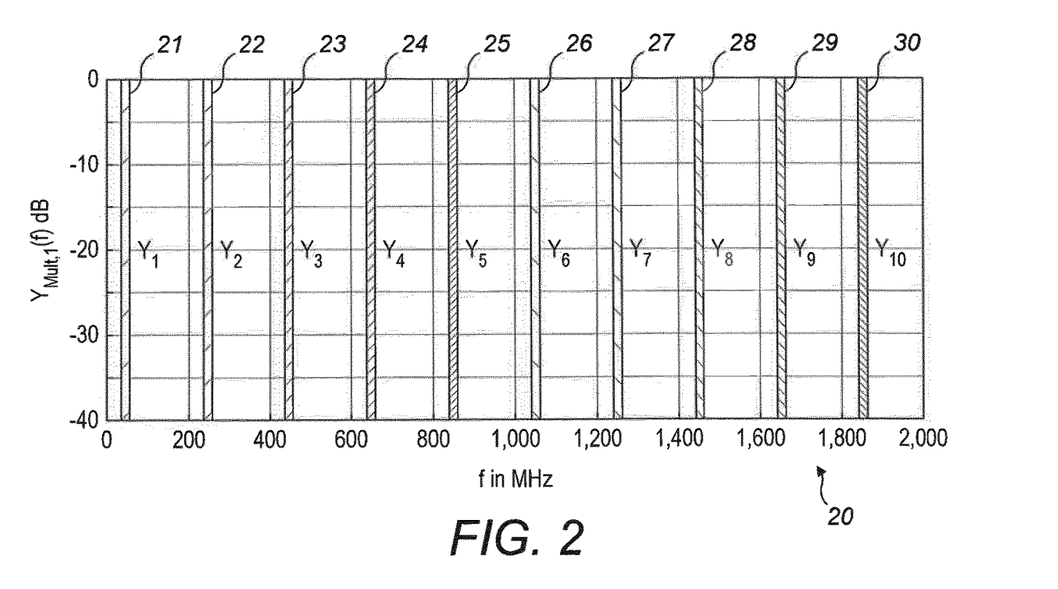
FIG. 2 shows an example signal output by the system of FIG. 1.

FIG. 2 shows a signal, indicated generally by the reference numeral 20, that is an example of the signal $y_{Mult,1}$ output by the system 1 of FIG. 1. The signal 20 is a frequency plot that includes first to tenth frequency components 21 to 30 respectively.

The first frequency component 21 is the signal output by the frequency multiplexing filter 6 described above. The tenth frequency component 30 is the signal output by the frequency multiplexing filter 16 described above. The second to ninth components 22 to 29 are output by frequency multiplexing filters of the respective channels of the system 1.

As shown in FIG. 2, the frequency components 21 to 30 lie within a 2 GHz bandwidth and each occupies 20 MHz of bandwidth. In order to fit the ten frequency bands into the 2 GHZ bandwidth, each of the frequency components 21 to 29 is separated by 200 MHz. Thus, if the first frequency component is centred on 30 MHz, the other frequency components are centred on 230, 430, 630, 830, 1030, 1230, 1430, 1630 and 1830 MHz respectively.

The frequency components of the signals $y_1$ to $y_i$ can be expressed mathematically as follows: $f_c-f_i=f_{offset,1}+((i-1)\times \Delta f)$, where, for the example above, $f_{offset,1}=30$ MHz and $\Delta f=200$ MHz.

It will be apparent that alternative embodiments may have different numbers of frequency components (more or fewer than 10), may occupy a different intermediate frequency bandwidth (smaller than or greater than 2 GHz), may have a different offset frequency (greater than or small than 30 MHz) and may have a different separation (smaller than or greater than 200 MHz).

The spacing between the frequency bands, as shown in FIG. 2, makes it relatively easy for the multiplexer 18 to combine the outputs of the channels into the single output $y_{Mult,1}$.

Figure 3:
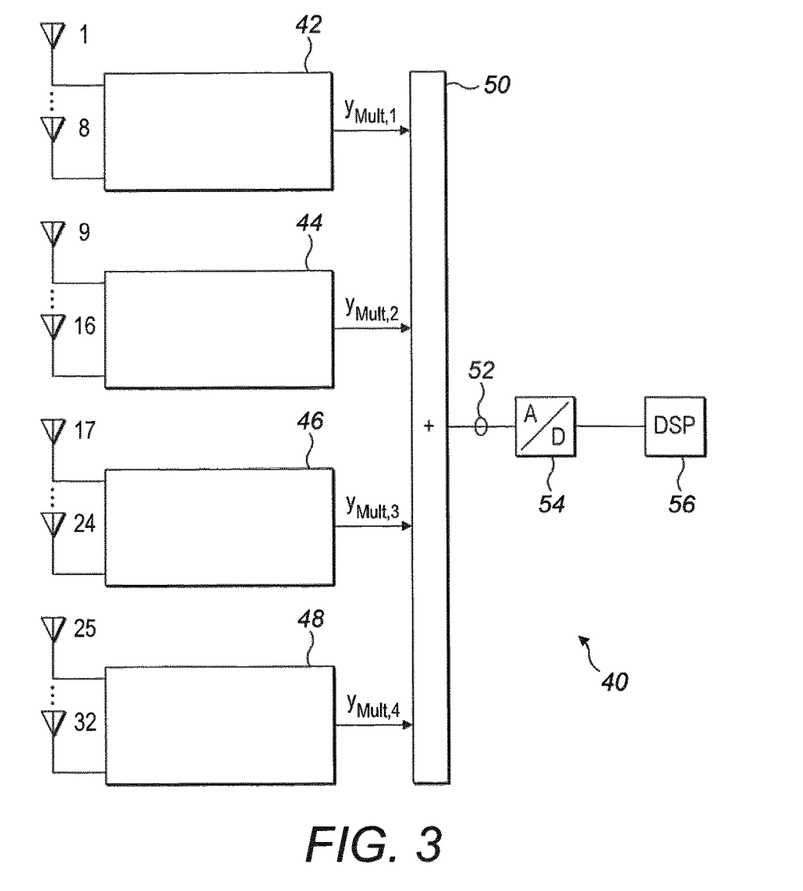
FIG. 3 is a block diagram of a receiver system in accordance with an example embodiment.

FIG. 3 is a block diagram of a receiver system, indicated generally by the reference numeral 40, in accordance with an example embodiment.

The receiver system 40 comprises a first receiver module 42, a second receiver module 44, a third receiver module 46 and a fourth receiver module 48. Each of those modules is similar to the system 1 described above and has a number of antennas each providing RF signals to a channel comprising a bandpass filter, an amplifier, a mixer and a frequency multiplexing filter. As shown in FIG. 3, the receiver modules 42 to 48 differ from the system 1 in that each module has eight antennas (and therefore eight channels) rather than ten.

The first receiver module 42 provides a first output $y_{Mult,1}$ similar to the output of the system 1 described above. Similarly, the second to fourth receiver modules 44 to 48 provides second to fourth outputs $y_{Mult,2}$, $y_{Mult,3}$ and $y_{Mult,4}$ respectively. The outputs of the first to fourth receiver modules 42 to 48 are provided to inputs of a power combiner module 50. As described in more detail below, the power combiner module 50 provides an output 52 that combines the outputs of the first to fourth receiver modules 48. The output 52 of the power combiner 50 is converted to a digital signal by analog-to-digital converter (ADC) 54. The output of the ADC 54 is processed by a digital signal processor (DSP) 56.

Figure 4:
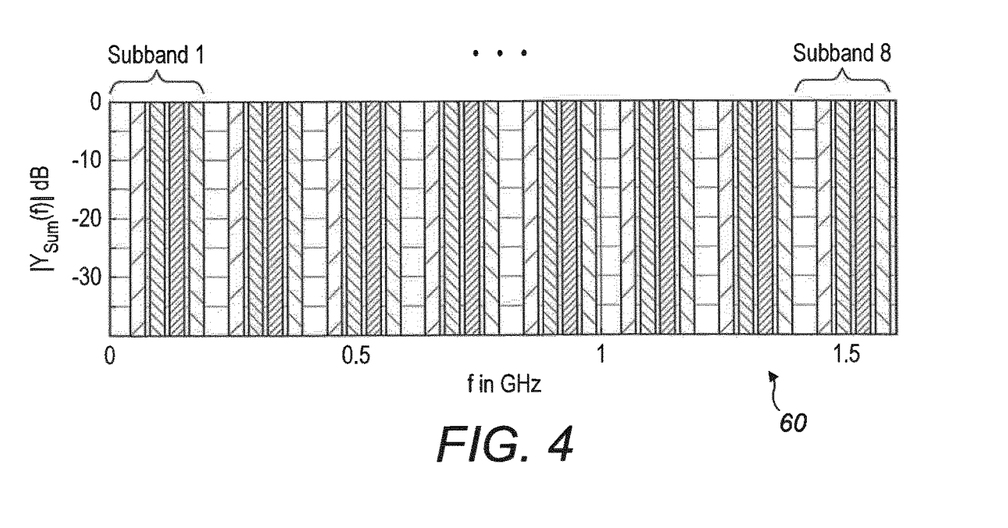
FIG. 4 shows a combined signal generated within the system of FIG. 3.

FIG. 4 shows a combined signal, indicated generally by the reference numeral 60, generated within the system of FIG. 3. The signal 60 shows the frequency spectrum of the output 52 of the power combiner 50.

As shown in FIG. 4, the signal 60 includes eight sub-bands (one sub-band for each channel of the modules 44 to 48). Each sub-band includes one signal from each of the receiver modules 44 to 48 (as described above with reference to FIG. 2). This can be expressed mathematically as follows:

$$f_c - f_i = f_{offset,k} + ((i-1) \times \Delta f), \text{ for } i=1,2,\ldots 8, \text{ where:}$$

$$f_{offset,k} = 30 \text{ MHz} + (k-1) \times 20 \text{ MHz, for } k=1,2,3,4; \text{ and}$$

$$\Delta f = 200 \text{ MHz}.$$

The receiver system 40 is modular and can be readily modified for different circumstances. Furthermore, each of the receiver modules 42, 44, 46 and 48 have the same structure and are therefore easy to produce.

The power combiner 50 may be implemented using a Wilkinson combiner. A Wilkinson combiner is a reciprocal microwave structure, which means that it can be used as a splitter or as a combiner (see below for the use of the same structure as a splitter).

Figure 5:
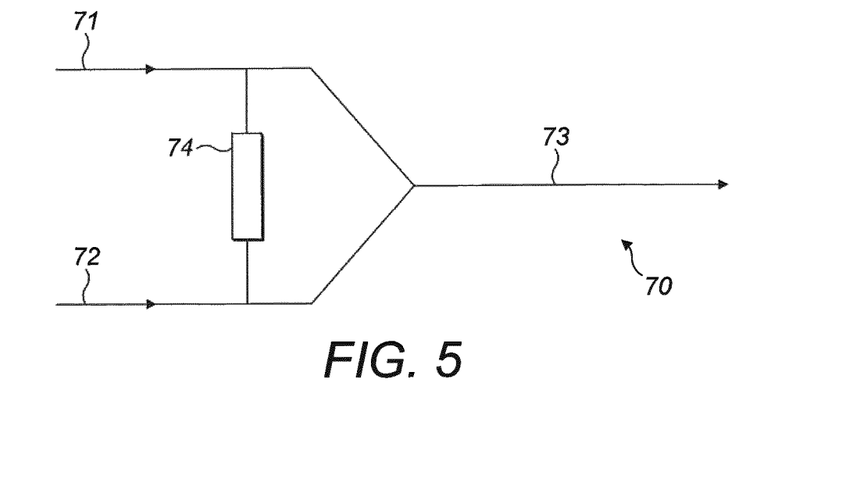
FIG. 5 is a highly schematic view of a Wilkinson power combiner module used in some example embodiments.

FIG. 5 is a highly schematic view of a Wilkinson combiner, indicated generally by the reference numeral 70, that can be used for RF signals on a first input 71 and a second input 72 to provide a combined first output 73. For two RF inputs, a coupling resistor 74 is provided to isolate the input ports from each other. The two RF inputs are added together over λ/4 microstrip lines. The isolation is generated by destructive interference where the propagated waves over the resistor and over the microstrip lines have exactly λ/2 path difference.

The ADC 54 converts the analog signals output by the power combiner 50 into digital signal. As indicated by the exemplary signal 60, the analog input to the ADC 54 is a wideband signal. It may therefore be required that the ADC 54 is a high-performance device having a relatively fast switching frequency.

Figure 6:
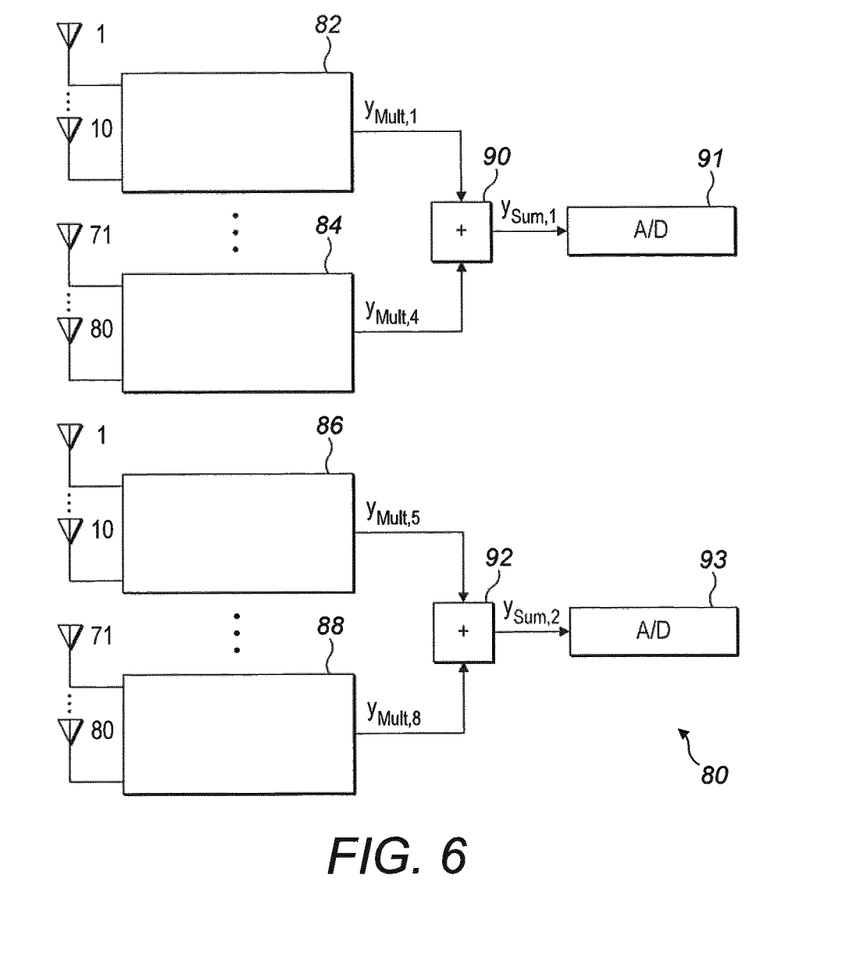
FIG. 6 is a block diagram of a receiver system in accordance with an example embodiment.

FIG. 6 is a block diagram of a receiver system, indicated generally by the reference numeral 80, in accordance with an example embodiment.

Figure 8:
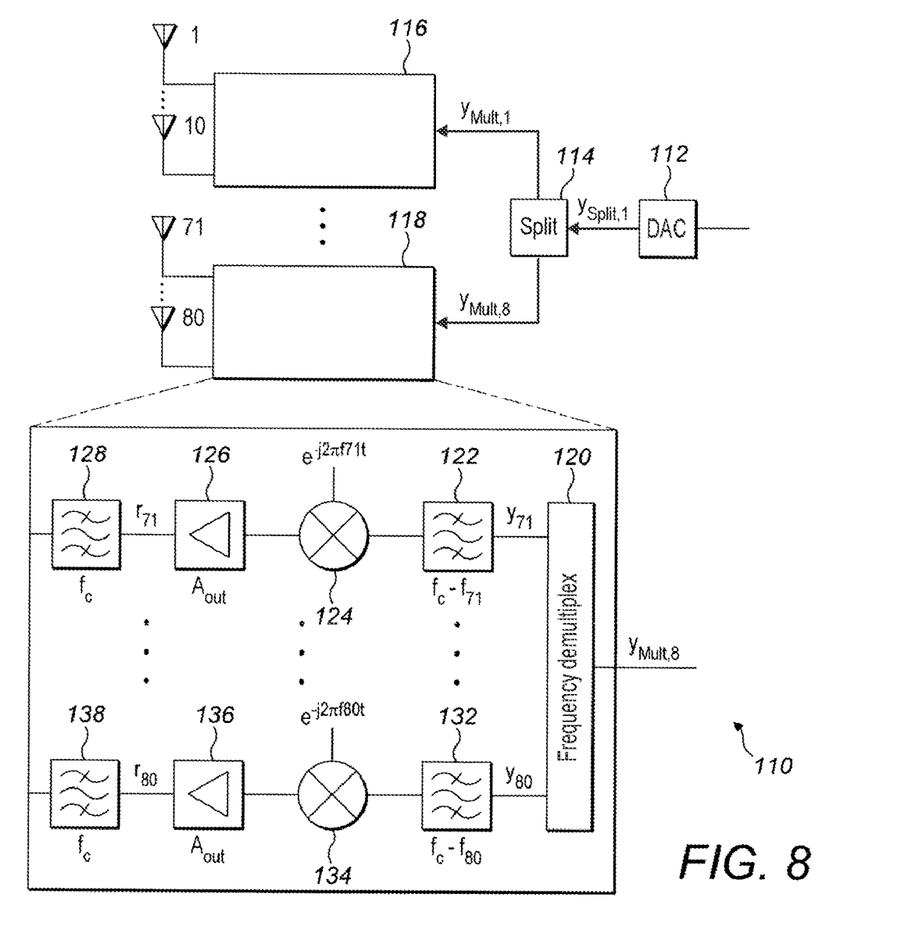
FIG. 8 is a block diagram of a transmitter system in accordance with an example embodiment.

The receiver system 80 comprises eight receiver modules, each similar to the first to fourth receiver modules 42 to 48 described above with reference to the system 40. In FIG. 8, only first receiver module 82, the second receiver module 84, the fifth receiver module 86 and the eighth receiver module 88 are shown. Each of the eight receiver modules of the system 80 has a number of antennas each providing RF signals to a channel comprising a bandpass filter, an amplifier, a mixer and a frequency multiplexing filter. In the example system 80, each of the receiver modules includes ten channels, so that a total of eighty channels are provided as part of the system 80.

As shown in FIG. 6, the first receiver module provides a first output $y_{Mult,1}$; that output is similar to the output of the receiver system 1 described above with reference to FIG. 1. As also shown in FIG. 6, the fourth, fifth and eighth receiver modules provide outputs $y_{Mult,4}$, $y_{Mult,5}$ and $y_{Mult,8}$ respectively. The second, third, sixth and seventh receiver modules provide similar outputs (not shown).

The outputs of the first to fourth receiver modules ($y_{Mult,1}$ to $y_{Mult,4}$) are provided to a first power combiner 90 (such as a Wilkinson combiner). The first power combiner 90 combines the outputs of the first to fourth receiver modules to provide a combined output $y_{Sum,1}$ and the received and combined analog signals are converted into digital signals by an ADC 91.

Similarly, the outputs of the fifth to eighth receiver modules ($y_{Mult,5}$ to $y_{Mult,8}$) are provided to a second power combiner 92 (such as a Wilkinson combiner). The second power combiner 92 combines the outputs of the fifth to eight receiver modules to provide a combined output $y_{Sum,2}$ and the received and combined analog signals are converted into digital signals by an ADC 92.

The system 80 differs from the system 40 in that two ADCs are required and two digital outputs are provided. Moreover, the ADCs 90 and 92 will typically need to be synchronised. Thus, the combiner modules in the system 80 may be simpler than the combiner module in the system 40, but at the cost of an extra ADC module and a potentially more complicated control system.

Figure 7:
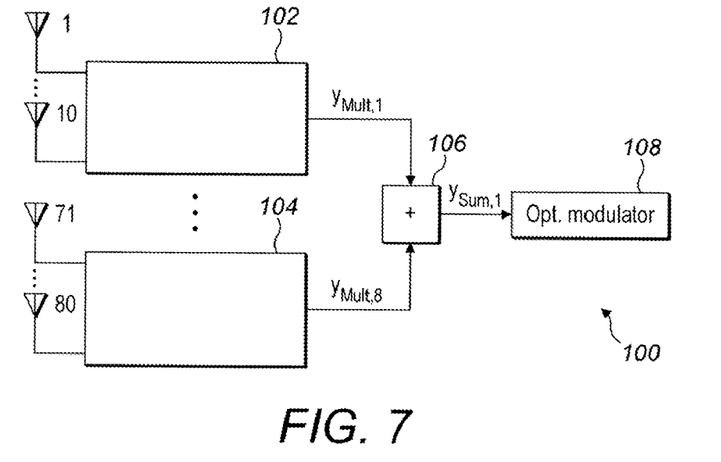
FIG. 7 is a block diagram of a receiver system in accordance with an example embodiment.

FIG. 7 is a block diagram of a receiver system, indicated generally by the reference numeral 100, in accordance with an example embodiment.

The receiver system 100 comprises eight receiver modules, each similar to the receiver modules described above with reference to the system 80. In FIG. 7, only the first receiver module 102 and the eighth receiver module 104 are shown. As in the system 80, each of the eight receiver modules of the system 100 has a number of antennas each providing RF signals to a channel comprising a bandpass filter, an amplifier, a mixer and a frequency multiplexing filter. Each of the receiver modules includes ten channels, so that a total of eighty channels are provided as part of the system 100.

As shown in FIG. 7, the first receiver module provides a first output $y_{Mult,1}$ and the eighth receiver module provides an eighth output $y_{Mult,8}$. Clearly, the other receiver modules provide the outputs described above with reference to FIG. 6.

The outputs of the receiver modules ($y_{Mult,1}$ to $y_{Mult,8}$) are provided to a power combiner 106 (such as a Wilkinson combiner). The power combiner 106 combines the outputs of the receiver modules to provide a combined output $y_{Sum,1}$.

The analog output of the power combiner 106 (the signal $y_{Sum,1}$) is provided to the input of an optical modulator 108. Thus, the analog signal output by the power combiner 106 can be transmitted optically. This can allow the analog signal to be transmitted, potentially over large distances, in the analog domain. By way of example, the optical modulator may shift the intermediate frequency analog signals output by the receiver modules to a frequency suitable for transmission by an optical fibre (e.g. of the order of several terahertz).

Clearly, the principles of the systems 80 and 100 could be combined such that two (or more) optical signals could be generated by two (or more) power combiners.

Moreover, although the system 100 does not include an ADC, an ADC may be provided following optical modulation (e.g. at the receiver end of an optical transmission system).

The embodiments described above relate to receiver systems. The principles described herein can also be applied to transmitters.

FIG. 8 is a block diagram of a transmitter system, indicated generally by the reference numeral 110, in accordance with an example embodiment.

The transmitter system 110 comprises a digital-to-analog converter (DAC) 112, a power splitter 114 and first to eighth transmitter modules 116 to 118. In FIG. 8, only the first transmitter module 116 and the eighth transmitter module 118 are shown. Details of the eighth transmitter module 118 are shown in FIG. 8 (and described below); the other transmitter modules are similar.

Figure 9:
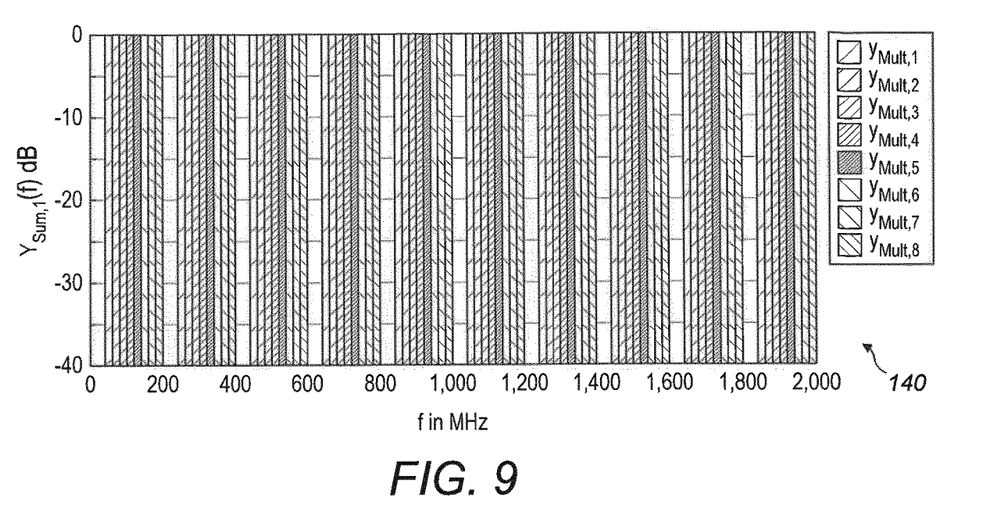
FIG. 9 shows a combined signal received by the system of FIG. 8.

The digital-to-analog converter (DAC) 112 receives a digital signal and provides an analog signal to the splitter 114. The output of the DAC 112 may take the form of the signal 140 shown in FIG. 9. In a similar way to the signal 60 described above with reference to FIG. 4, the signal 140 includes ten sub-bands, each sub-band including one signal for each of the transmitter modules (such as transmitter modules 116 to 118). In a similar way to the signal 60, this can be expressed mathematically as follows (where the variables are provided by way of example only):

$$f_c - f_i = f_{offset,k} + ((i-1) \times \Delta f), \text{ for } i=1,2, \ldots 10, \text{ where:}$$

$$f_{offset,k} = 30 \text{ MHz} + (k-1) \times 20 \text{ MHz, for } k=1,2, \ldots 8;$$
and $$\Delta f = 200 \text{ MHz}.$$

The splitter 114 may be a Wilkinson splitter and may take the same form as the Wilkinson device 70 described above. In this case, the reference numeral 73 represents the combined input (rather than the combined output as described above). Of course, whilst two outputs (the outputs 71 and 72) are shown in FIG. 5, the system no requires that the splitter 114 has eight outputs (providing signals $y_{Mult,1}$ to $y_{Mult,8}$ respectively).

Thus, the splitter 114 provides eight outputs ($y_{Mult,1}$ to $y_{Mult,8}$), with each output being similar to the signal 20 described above with reference to FIG. 2. The eight outputs $y_{Mult,1}$ to $y_{Mult,8}$ are provided to the eight transmitter modules 116 to 118 respectively.

As shown in FIG. 8, the eighth transmitter module 118 includes a frequency demultiplexer 120 receiving the signal $y_{Mult,8}$ from the splitter module 114. The demultiplexer splits the signal $y_{Mult,8}$ into its component parts ($y_{71}$ to $y_{80}$ in the example system 110), with each of those component parts being provided to a separate RF channel of the transmitter module 118.

The transmitter module 118 includes eight RF channels. Of those, the first channel (transmitting $y_{71}$) and the eighth channel (transmitting $y_{80}$) are shown. The first RF channel includes a filter 122, an upconverter 124, an amplifier 126 and a further filter 128. Similarly, the eighth RF channel includes a filter 132, an upconverter 134, an amplifier 136 and a further filter 138. Thus, it can be seen that the transmitter modules 116 to 118 mirror the receiver modules of the systems described above. The other RF channels of the transmitter modules 116 to 118 are similar.

The system no has been described as having a single power splitter 114. Of course, more power splitter modules could be provided (for example, the system could include two power splitter modules in a similar way that the system 80 described above includes two power combiner modules).

Similarly, the input to the splitter module(s) 114 could be provided by an optical modulator in a similar way that the system 100 described above inputs an optical modulator. Of course, arrangements including an optical modulator and a plurality of power splitter modules are possible.

It should be noted that the receiver and transmitter systems described herein are almost identical. In some embodiments, only the amplifier needs to be turned around. Indeed, the systems may be identical, with two amplifiers being provided together with a switch to determine which of the amplifiers is used.

Figure 10:
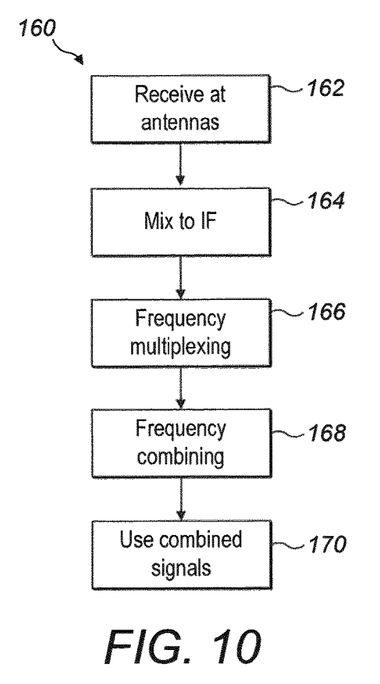
FIG. 10 is a flow chart showing an algorithm in accordance with an example embodiment.

FIG. 10 is a flow chart showing an algorithm, indicated generally by the reference numeral 160, in accordance with an example embodiment. The algorithm 160 shows exemplary uses of the receiver systems described above with reference to FIGS. 1 to 7.

The algorithm 160 starts at operation 162 where signals are received at antennas of a system (such as antennas of the systems 1, 40, 80 and 100). For each RF channel, the RF signals are converted by a mixer to an intermediate frequency for that channel (operation 164) and the intermediate frequency signal for each of a group of channel is multiplexed (operation 166) before being combined with multiplexed intermediate frequency signals from other groups of channels (operation 168). The combined signals (which might have the form of the signal 60) is then used (operation 170). The use of the combined signals may include an ADC conversion in order to obtain digital data and may include the use of a digital signal processor or some other processor for using the data. The use of the combined signals may include the use of an optical modulator to transmit the data (in optical form) to another location.

Figure 11:
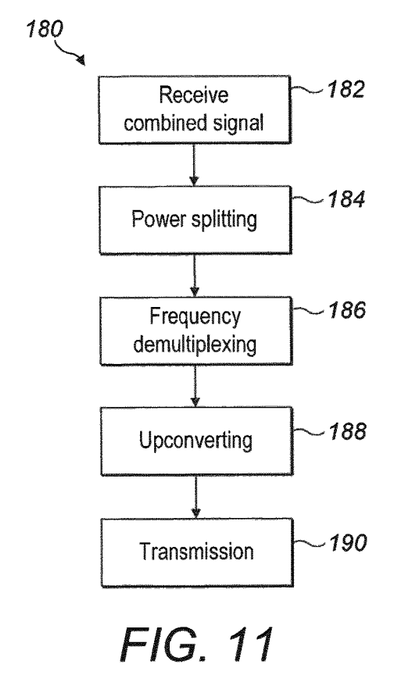
FIG. 11 is a flow chart showing an algorithm in accordance with an example embodiment.

FIG. 11 is a flow chart showing an algorithm, indicated generally by the reference numeral 180, in accordance with an example embodiment. The algorithm 180 shows exemplary uses of the transmitter system described above with reference to FIGS. 8 and 9.

The algorithm 180 starts at operation 182 where a combined signal is received. The combined signal may be in digital form and may be received from the output of an ADC (such as the ADC 112 described above). The combined signal may be received from the output of an optical modulator. The combined signal received in the operation 182 may, for example, take the form of the signal 140 described above.

The combined signal received at operation 182 is split (operation 184) into a number of groups of signals. Each group of signals is demultiplexed to provide a plurality of intermediate frequency signals for transmission (operation 186). Each intermediate frequency signal is upconvertered to provide an RF signal for transmission (operation 188) and is transmitted in operation 190.

Figure 12:
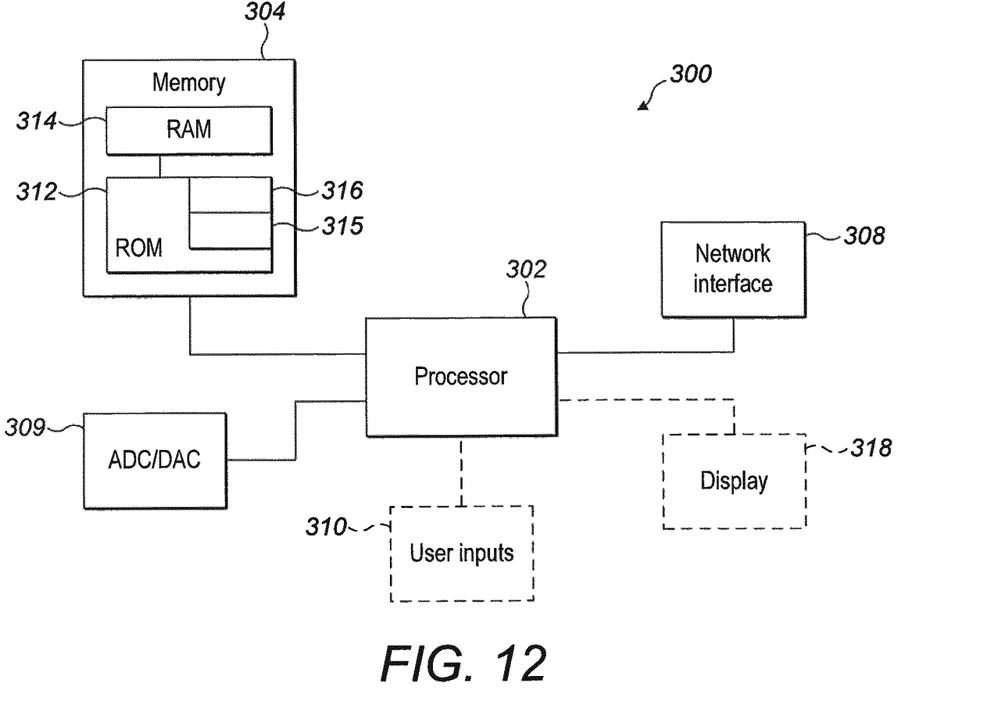
FIG. 12 is a block diagram of a system in accordance with an example embodiment.

For completeness, FIG. 12 is a schematic diagram of components of one or more of the modules described previously (e.g. the transmitter or receiver modules), which hereafter are referred to generically as processing systems 300. A processing system 300 may have a processor 302, a memory 304 closely coupled to the processor and comprised of a RAM 314 and ROM 312, and, optionally, hardware keys 310 and a display 318. The processing system 300 may comprise one or more network interfaces 308 for connection to a network, e.g. a modem which may be wired or wireless and may include an ADC or DAC module 309 for providing a combined input or generated a combined output in accordance with the embodiments described above.

The processor 302 is connected to each of the other components in order to control operation thereof.

The memory 304 may comprise a non-volatile memory, a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor, implements aspects of the algorithms 160 and/or 180.

The processor 302 may take any suitable form. For instance, it may be a microcontroller, plural microcontrollers, a processor, or plural processors.

The processing system 300 may be a standalone computer, a server, a console, or a network thereof.

In some embodiments, the processing system 300 may also be associated with external software applications. These may be applications stored on a remote server device and may run partly or exclusively on the remote server device. These applications may be termed cloud-hosted applications. The processing system 300 may be in communication with the remote server device in order to utilize the software application stored there.

Figure 13A:
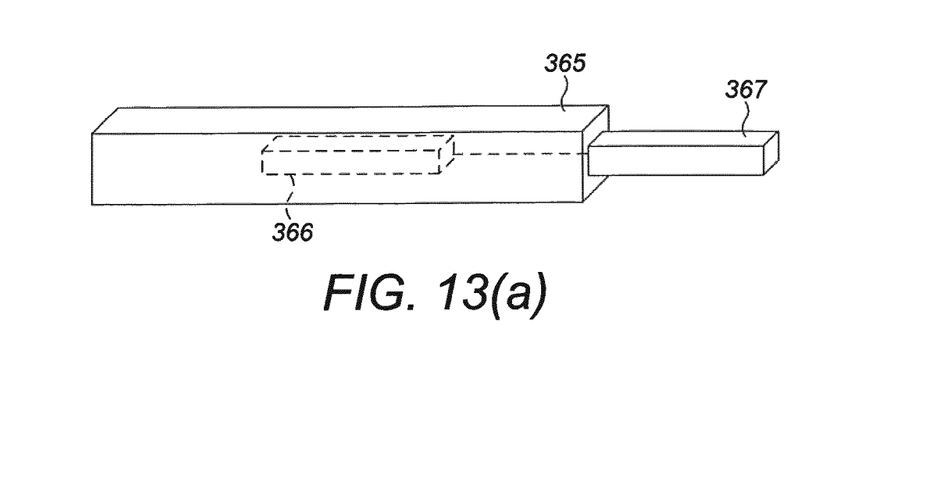
FIGS. 13a and 13b show tangible media, respectively a removable memory unit and a compact disc (CD) storing computer-readable code which when run by a computer perform operations according to embodiments.
Figure 13B:
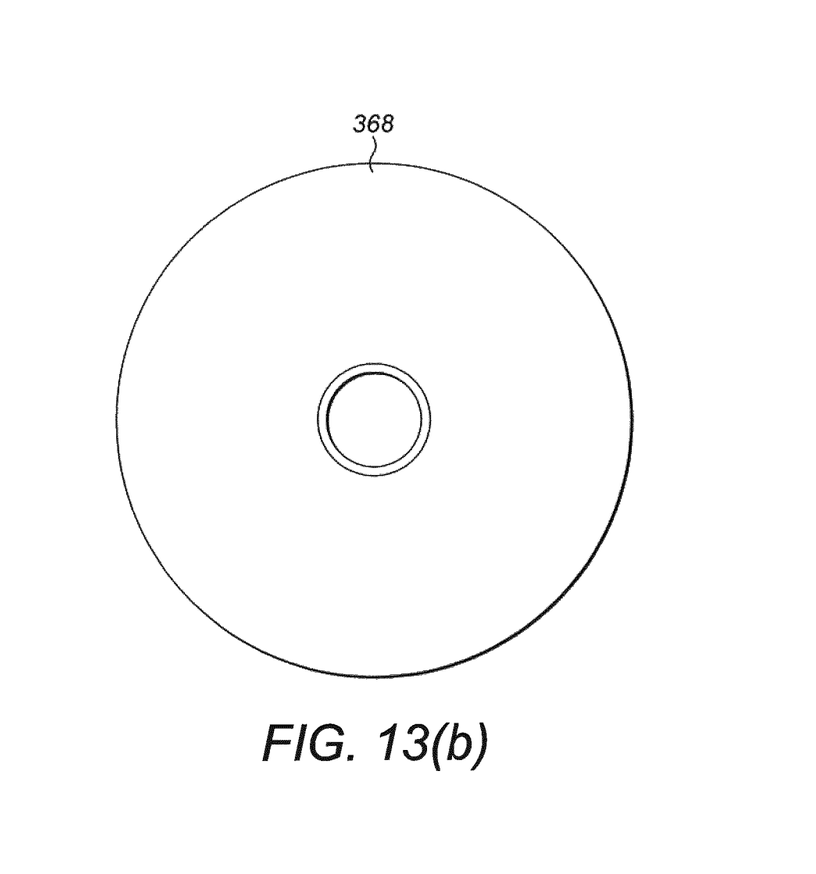

FIGS. 13a and 13b show tangible media, respectively a removable memory unit 365 and a compact disc (CD) 368, storing computer-readable code which when run by a computer may perform methods according to embodiments described above. The removable memory unit 365 may be a memory stick, e.g. a USB memory stick, having internal memory 366 storing the computer-readable code. The memory 366 may be accessed by a computer system via a connector 367. The CD 368 may be a CD-ROM or a DVD or similar. Other forms of tangible storage media may be used.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

As used in this application, the term "circuitry" refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a server, to perform various functions) and (c) to circuits, such as a microprocessor(s) or a portion of a microprocessor(s), that require software or firmware for operation, even if the software or firmware is not physically present.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 10 and 11 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. A receiver comprising:
a plurality of receiver modules, wherein each receiver module comprises a plurality of channels, each channel comprising a receiver antenna and a mixer for converting an output of the respective antenna to an analog intermediate frequency signal having a frequency;
a plurality of multiplexer modules, each multiplexer module associated with one of the plurality of receiver modules, wherein each multiplexer module is configured to combine the analog intermediate frequency signals of the respective channels into a receiver module analog intermediate frequency signal; and
a power combiner module having a plurality of inputs and an output, the power combiner module configured to receive the receiver module analog intermediate frequency signals from each of the plurality of multiplexer modules and to combine said receiver module intermediate frequency signals to generate a composite output signal at the output of the power combiner module, wherein the power combiner is a passive device,
wherein:
the frequency of the intermediate frequency signal of each channel of each receiver module is different.

2. A receiver as claimed in claim 1, wherein at least one of the following;
a) a frequency range of the frequencies of the analog intermediate frequency signals of the channels is divided into a plurality of sub-bands, wherein, for each receiver module, the frequency of each channel is within a different sub-band, or b) each sub-band includes an analog intermediate frequency signal from each of the plurality of receiver modules.

3. A receiver as claimed in claim 1, wherein at least one of the following;
   a) the power combiner module comprises a plurality of power combiner modules,
   or
   b) the or each power combiner module is a Wilkinson combiner.

4. A receiver as claimed in claim 3 wherein at least one of the following;
   a) further comprising an analog-to-digital converter for converting the composite output signal into a digital signal,
   or
   b) each further comprising an optical modulator for converting the composite output signal into an optical output signal.

5. A transmitter comprising:
   a plurality of transmitter modules, wherein each transmitter module comprises a plurality of channels, each channel comprising a transmit antenna and an upconverter for converting an analog intermediate frequency signal having a frequency into an output for the respective antenna;
   a plurality of demultiplexer modules, each demultiplexer module associated with one of the plurality of transmitter modules, wherein each demultiplexer module is configured to split an analog transmit module intermediate frequency signal into the analog intermediate frequency signals of the respective channel; and
   a power splitter module having an input configured to receive a composite input signal and a plurality of outputs configured to provide the transmit module intermediate frequency signals for each of the plurality of demultiplexers, wherein the power splitter module is a passive device,
   wherein:
   the frequency of the intermediate frequency signal of each channel of each transmitter module is different.

6. A transmitter as claimed in claim 5, wherein at least one of the following;
   a) the power splitter module is a Wilkinson splitter,
   or
   b) further comprising a digital-to-analog converter for converting a digital signal into the composite input signal.

7. A method comprising:
   receiving radio frequency signals at a plurality of receiver modules, wherein each receiver module comprises a plurality of channels, each channel comprising a receiver antenna and a mixer for converting an output of the respective antenna to an analog intermediate frequency signal having a frequency;
   for each of the plurality of receiver modules, combining the analog intermediate frequency signals of the respective channels into a receiver module analog intermediate frequency signal; and
   combining the receiver module analog intermediate frequency signals for each of the plurality of receiver modules into a composite output signal,
   wherein the frequency of the intermediate frequency signal of each channel of each receiver module is different.

8. A method as claimed in claim 7, wherein at least one of the following;
   a) a frequency range of the frequencies of the analog intermediate frequency signals of the channels is divided into a plurality of sub-bands, wherein, for each receiver module, the frequency of each channel is within a different sub-band,
   or
   b) wherein each sub-band includes an analog intermediate frequency signal from each of the plurality of receiver modules,
   or
   c) further comprising converting the composite output signal into a digital signal,
   d) further comprising converting the composite output signal into an optical output signal.

9. A method as claimed in claim 8, wherein each channel is an independent channel, able to receive a different information stream.

10. A method comprising:
    splitting a composite input signal comprising a plurality of combined transmit module intermediate frequency signals into a plurality of transmit module analog intermediate frequency signals, wherein each of the plurality of transmit module analog intermediate frequency signals is for one of a plurality of transmitter modules;
    dividing each of the plurality of transmit module analog intermediate frequency signals into a plurality of analog intermediate frequency signals for one of the plurality of transmitter modules, wherein each of the transmitter modules has a plurality of channels, each channel for transmitting one of said analog intermediate frequency signals; and
    for each channel, upconverting the respective analog intermediate frequency signal to a radio frequency signal and transmitting the radio frequency signal using an antenna,
    wherein the frequency of each analog intermediate frequency signal of each channel of each transmitter module is different.

11. A method as claimed in claim 10, wherein at least one of the following;
    a) a frequency range of the frequencies of the analog intermediate frequency signals of the channels is divided into a plurality of sub-bands, wherein, for each transmitter module, the frequency of each channel is within a different sub-band,
    or
    b) wherein each sub-band includes an analog intermediate frequency signal for each of the plurality of transmitter modules.

12. A method as claimed in claim 11, c) further comprising converting the composite input signal from a digital signal to an analog signal,
    or
    d) wherein each channel is an independent channel, able to transmit a different information stream.

13. An apparatus comprising a plurality of receiver modules;
    wherein each receiver module comprises a plurality of channels, each channel comprising a receiver connected to an antenna and a mixer for converting an output of the respective antenna to an analog intermediate frequency signal having a frequency;

a plurality of multiplexer modules, each multiplexer module associated with one of the plurality of receiver modules, wherein each multiplexer module is configured to combine the analog intermediate frequency signals of the respective channels into a receiver module analog intermediate frequency signal; and a power combiner module having a plurality of inputs and an output, the power combiner module configured to receive the receiver module analog intermediate frequency signals from each of the plurality of multiplexer modules and to combine said receiver module intermediate frequency signals to generate a composite output signal at the output of the power combiner module, wherein the power combiner is a passive device, wherein:

the frequency of the intermediate frequency signal of each channel of each receiver module is different.

14. An apparatus comprising a receiver as claimed in claim 13, wherein at least one of the following;
  a) the receiver is configured for a frequency range of the frequencies of the analog intermediate frequency signals of the channels is divided into a plurality of sub-bands, wherein, for each receiver module, the frequency of each channel is within a different sub-band,
  or
  b) each sub-band includes an analog intermediate frequency signal from each of the plurality of receiver modules.

15. A receiver as claimed in claim 13, wherein at least one of the following;
  a) the power combiner module comprises a plurality of power combiner modules,
  or
  b) the or each power combiner module is a Wilkinson combiner.

* * * * *